US012614521B2

(12) United States Patent
Gao et al.

(10) Patent No.: US 12,614,521 B2
(45) Date of Patent: Apr. 28, 2026

(54) DISPLAY PANEL AND DISPLAY DEVICE

(71) Applicant: Xiamen Tianma Display Technology Co., Ltd., Xiamen (CN)

(72) Inventors: Yana Gao, Xiamen (CN); Xingyao Zhou, Xiamen (CN); Kang Yang, Xiamen (CN); Mengmeng Zhang, Xiamen (CN); Gaojun Huang, Xiamen (CN)

(73) Assignee: Xiamen Tianma Display Technology Co., Ltd., Xiamen (CN)

(*) Notice: Subject to any disclaimer, the term of this patent is extended or adjusted under 35 U.S.C. 154(b) by 0 days.

(21) Appl. No.: 18/735,074

(22) Filed: Jun. 5, 2024

(65) Prior Publication Data

US 2024/0321211 A1 Sep. 26, 2024

(30) Foreign Application Priority Data

Sep. 28, 2023 (CN) ......................... 202311277853.5

(51) Int. Cl.
*G09G 3/3258* (2016.01)

(52) U.S. Cl.
CPC ... *G09G 3/3258* (2013.01); *G09G 2300/0819* (2013.01); *G09G 2310/061* (2013.01); *G09G 2310/08* (2013.01); *G09G 2320/0233* (2013.01); *G09G 2320/0247* (2013.01)

(58) Field of Classification Search
CPC ......... G09G 3/3233; G09G 2300/0819; G09G 2300/0842
See application file for complete search history.

(56) References Cited

U.S. PATENT DOCUMENTS

2021/0327352 A1* 10/2021 Zhang .................. G09G 3/3291
2021/0383743 A1* 12/2021 Yuan ........................ G09G 3/32
2024/0144859 A1* 5/2024 Zhang ...................... G09G 3/32
2024/0221644 A1* 7/2024 Li ........................ G09G 3/3233
2024/0321211 A1* 9/2024 Gao ..................... G09G 3/3258
2024/0355293 A1* 10/2024 Gao ..................... G09G 3/3233
2025/0046252 A1* 2/2025 Kuang ............... H10K 59/1213
2025/0191523 A1* 6/2025 Zhang .................. G09G 3/3266

FOREIGN PATENT DOCUMENTS

CN 108878494 A 11/2018
CN 112634832 A 4/2021

* cited by examiner

*Primary Examiner* — Van N Chow
(74) *Attorney, Agent, or Firm* — KDW Firm PLLC

(57) ABSTRACT

Provided is a display panel includes a pixel circuit and a light-emitting element. The pixel circuit includes a drive circuit, a data write circuit and a bias compensation circuit. The operation process of the pixel circuit includes a data write stage, a first bias compensation stage and a second bias compensation stage. In the data write stage, the data write circuit is turned on, and a data voltage terminal writes a data voltage signal to a first terminal of the drive circuit. In the first bias compensation stage, the data write circuit is turned on, and the data voltage terminal writes the data voltage signal to the first terminal of the drive circuit. In the second bias compensation stage, the bias compensation circuit is turned on, and a bias compensation voltage terminal writes a bias adjustment voltage signal to the first terminal of the drive circuit.

14 Claims, 8 Drawing Sheets

DISPLAY PANEL AND DISPLAY DEVICE

CROSS-REFERENCE TO RELATED APPLICATION(S)

This application claims priority to Chinese Patent Application No. 202311277853.5 filed Sep. 28, 2023, the disclosure of which is incorporated herein by reference in its entirety.

TECHNICAL FIELD

The present invention relates to the field of display technologies and, in particular, to a display panel and a display device.

BACKGROUND

In a display device, a pixel circuit provides a light-emitting element with a drive current required for display and controls whether the light-emitting element enters a light emission stage. Therefore, the pixel circuit becomes an indispensable element in most display devices. However, as the use time increases, the internal characteristics of a drive transistor in the pixel circuit change slowly, causing a threshold voltage of the drive transistor to drift. This affects a drive current generated by the drive transistor, thereby leading to a dissatisfactory display effect of the display device. As a result, a picture flicker easily occurs.

Therefore, the driving effect of the drive transistor may be improved by biasing the drive transistor. However, the bias effect of the drive transistor is relatively poor in the related art.

SUMMARY

In view of this, the present invention provides a display panel and a display device to help improve the bias effect of a drive transistor and improve the problem of a picture flicker when a display panel displays in the related art.

The present invention provides a display panel. The display panel includes a pixel circuit and a light-emitting element electrically connected to the pixel circuit. The pixel circuit includes a drive circuit, a data write circuit and a bias compensation circuit, a first terminal of the data write circuit is connected to a data voltage terminal, a second terminal of the data write circuit is electrically connected to a first terminal of the drive circuit, a first terminal of the bias compensation circuit is connected to a bias compensation voltage terminal, and a second terminal of the bias compensation circuit is electrically connected to the first terminal of the drive circuit. Within display time of one frame of the display panel, an operation process of the pixel circuit includes a data write stage, a first bias compensation stage and a retention stage, the first bias compensation stage is located between the data write stage and the retention stage, and the retention stage includes at least one second bias compensation stage. In the data write stage, the data write circuit is turned on, and the data voltage terminal writes a data voltage signal to the first terminal of the drive circuit. In the first bias compensation stage, the data write circuit is turned on, and the data voltage terminal writes the data voltage signal to the first terminal of the drive circuit. In the at least one second bias compensation stage, the bias compensation circuit is turned on, and the bias compensation voltage terminal writes a bias adjustment voltage signal to the first terminal of the drive circuit.

Based on a same idea, the present invention further provides a display device. The display device includes a display panel. The display panel includes a pixel circuit and a light-emitting element electrically connected to the pixel circuit. The pixel circuit includes a drive circuit, a data write circuit and a bias compensation circuit, a first terminal of the data write circuit is connected to a data voltage terminal, a second terminal of the data write circuit is electrically connected to a first terminal of the drive circuit, a first terminal of the bias compensation circuit is connected to a bias compensation voltage terminal, and a second terminal of the bias compensation circuit is electrically connected to the first terminal of the drive circuit. Within display time of one frame of the display panel, an operation process of the pixel circuit includes a data write stage, a first bias compensation stage and a retention stage, the first bias compensation stage is located between the data write stage and the retention stage, and the retention stage includes at least one second bias compensation stage. In the data write stage, the data write circuit is turned on, and the data voltage terminal writes a data voltage signal to the first terminal of the drive circuit. In the first bias compensation stage, the data write circuit is turned on, and the data voltage terminal writes the data voltage signal to the first terminal of the drive circuit. In the at least one second bias compensation stage, the bias compensation circuit is turned on, and the bias compensation voltage terminal writes a bias adjustment voltage signal to the first terminal of the drive circuit.

BRIEF DESCRIPTION OF DRAWINGS

The drawings, which are incorporated in the specification and form part of the specification, illustrate embodiments of the present invention and are intended to explain the principles of the present invention together with the description of the drawings.

DETAILED DESCRIPTION

Figure 1:
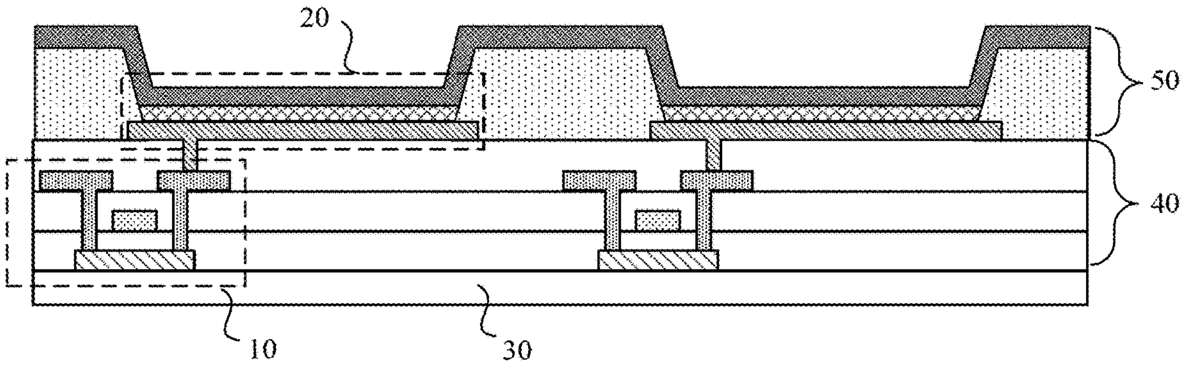
FIG. 1 is a partial section diagram of a display panel according to the present invention.

Example embodiments of the present invention are described in detail with reference to the drawings. It is to be noted that relative arrangements of components and steps, numerical expressions, and numerical values set forth in these embodiments do not limit the scope of the present invention unless otherwise specifically indicated.

The following description of at least one example embodiment is illustrative in nature and is definitely not intended to limit the present invention or an application or use thereof.

Techniques, methods and devices known to those of ordinary skill in the art may not be discussed in detail, but where appropriate, such techniques, methods and devices should be considered as part of the specification.

In all examples shown and discussed herein, any specific values are to be construed as exemplary and non-limiting. Therefore, other examples of the example embodiments may have different values.

It is to be noted that similar reference numerals and letters represent similar items in the following drawings. Therefore, once a particular item is defined in one drawing, the particular item does not need to be further discussed in subsequent drawings.

In the invention and creation process of the present application, the inventors have found that a display panel using organic light-emitting technology has a problem of abnormal brightness in the first or first few frames of a switching picture when directly undergoing picture switching between a high scale and a low scale at a low refresh rate, that is, a screen smear occurs, so that the visual experience is affected. Specifically, when the display panel is at a low refresh rate, the potential of the gate of a drive transistor remains unchanged for a long time, thereby causing the device characteristic of the drive transistor to offset. Therefore, when the display panel directly undergoes picture switching between a high scale and a low scale at a low refresh rate, due to the change in the device characteristic of the drive transistor, the problem of abnormal brightness occurs, that is, a screen smear occurs, so the visual experience is affected. Specifically, when a low-grayscale picture is switched to a high-grayscale picture, the first or first few frames of the high-grayscale picture have an excessively low brightness, and when the high-grayscale picture is switched to the low-grayscale picture, the first or first few frames of the low-grayscale picture have an excessively high brightness. In this case, a bias stage may be added within display time of one frame of the display panel, and the drive transistor is biased in the bias stage, but the bias stage after a data write stage and the bias stage in the retention stage need to be set differentially to improve the problem of a picture flicker when the display panel displays. The support of an existing driver chip for timing is merely limited to the bias stage after the data write stage and the bias stage in the retention stage that are set at the same period or at different periods but with the same signal. This limits the setting of the bias effects in different stages within the display time of one frame of the display panel. Certainly, the bias stage after the data write stage and the bias stage in the retention stage may also be set differentially by adjusting the architecture of the driver chip, but this increases the setting cost and power consumption of the driver chip.

Based on the preceding research, the present application provides a display panel and a display device to improve the problem of a picture flicker when the display panel displays in the related art and effectively reduce the setting cost and power consumption of the driver chip. The display panel provided in the present application and having the preceding technical effect is described below in detail.

Figure 2:
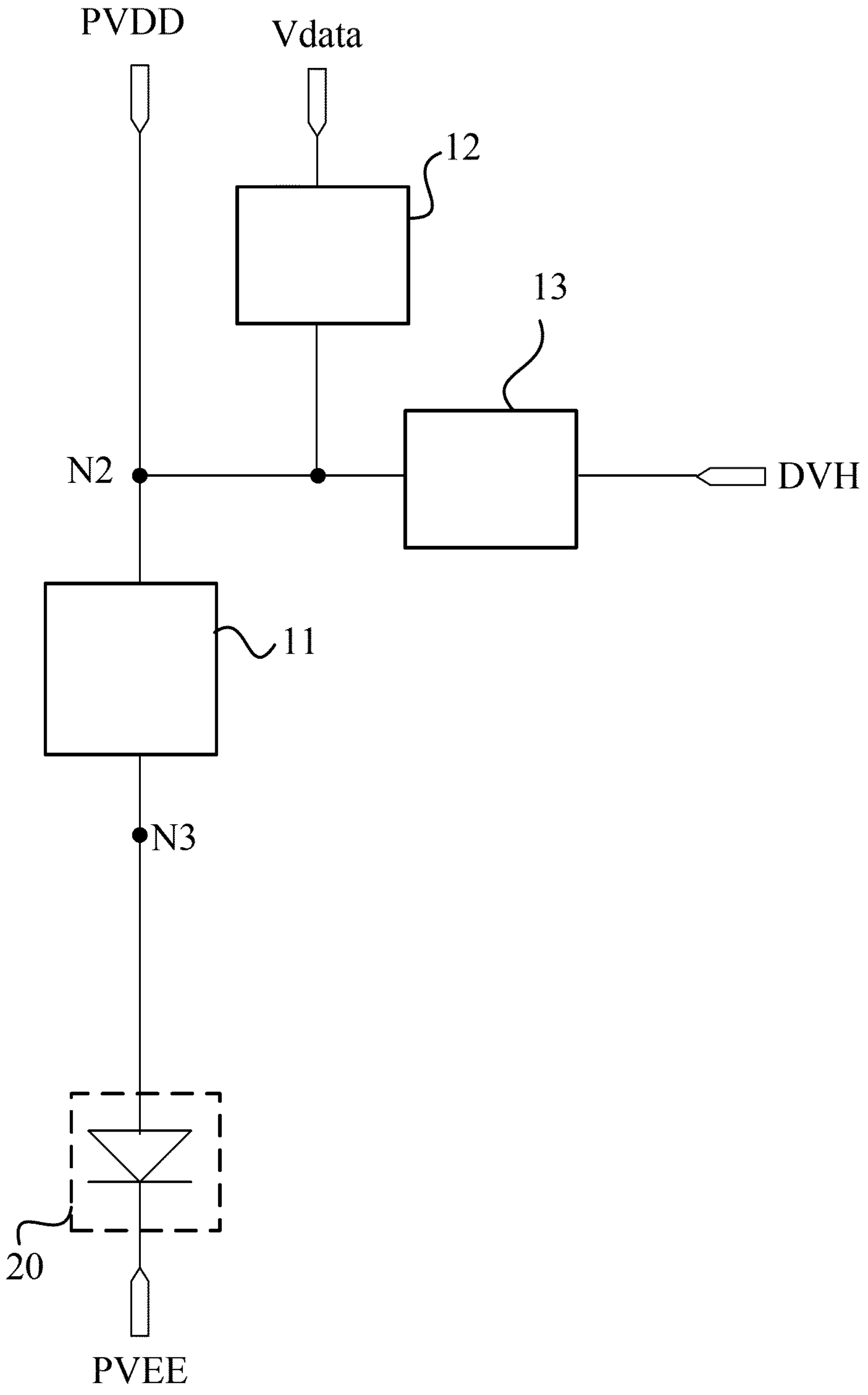
FIG. 2 is a diagram illustrating the structure of a pixel circuit according to the present invention.
Figure 3:
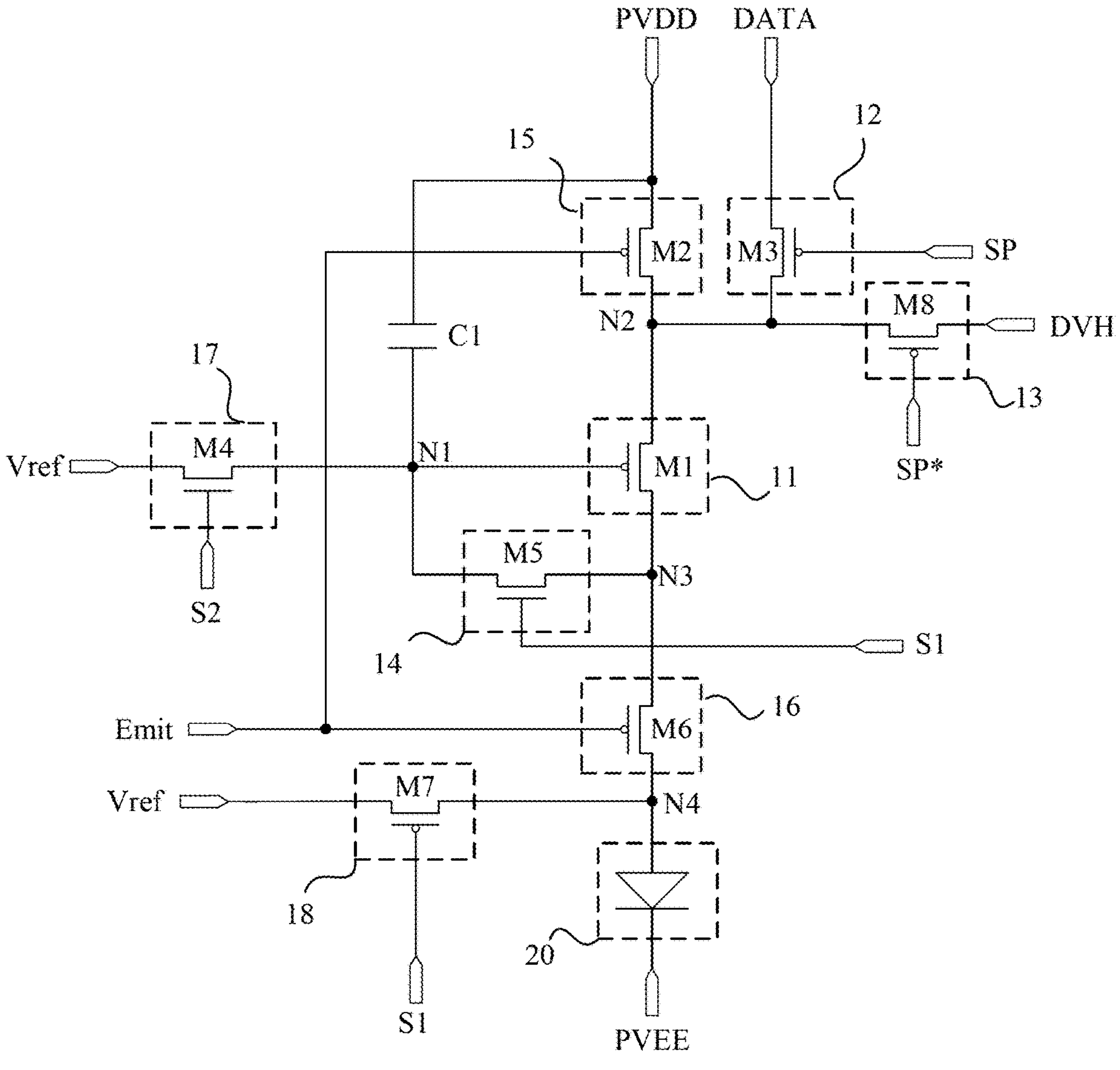
FIG. 3 is a circuit diagram illustrating a pixel circuit according to the present invention.
Figure 4:
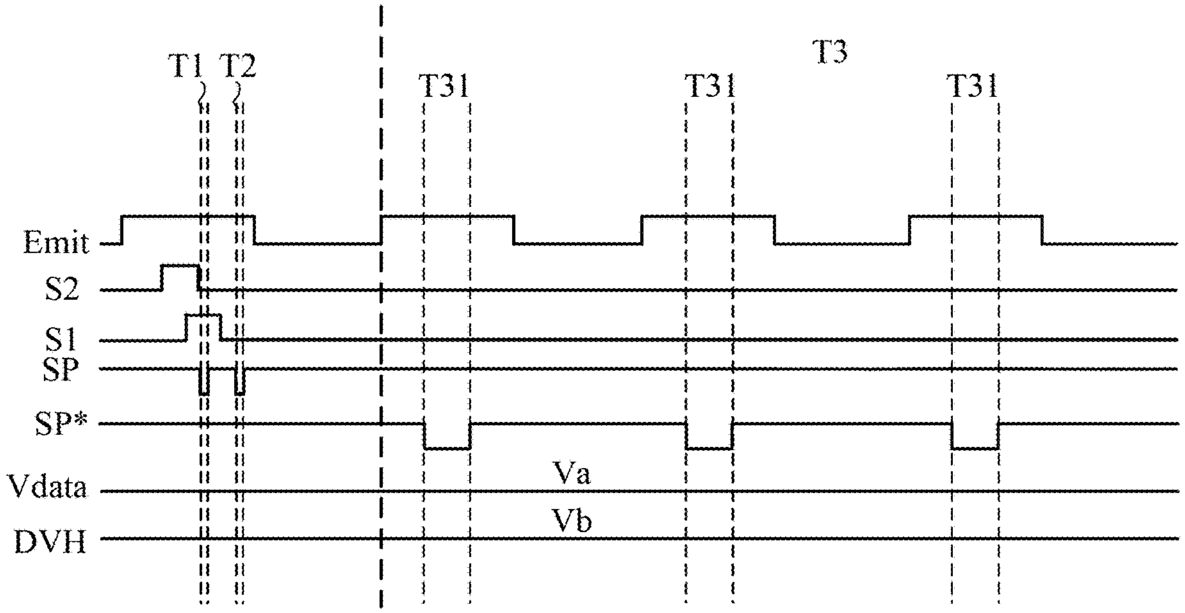
FIG. 4 is a drive timing diagram according to the present invention.

FIG. 1 is a partial section diagram of a display panel according to the present invention. FIG. 2 is a diagram illustrating the structure of a pixel circuit according to the present invention. FIG. 3 is a circuit diagram illustrating a pixel circuit according to the present invention. FIG. 4 is a drive timing diagram according to the present invention. Referring to FIGS. 1 to 4, this embodiment provides a display panel. The display panel includes a pixel circuit 10 and a light-emitting element 20 electrically connected to the pixel circuit 10. The pixel circuit 10 includes a drive circuit 11, a data write circuit 12 and a bias compensation circuit 13. A first terminal of the data write circuit 12 is connected to a data voltage terminal Vdata, and a second terminal of the data write circuit 12 is electrically connected to a first terminal of the drive circuit 11. A first terminal of the bias compensation circuit 13 is connected to a bias compensation voltage terminal DVH, and a second terminal of the bias compensation circuit 13 is electrically connected to the first terminal of the drive circuit 11.

Within display time of one frame of the display panel, the operation process of the pixel circuit 10 includes a data write stage T1, a first bias compensation stage T2 and a retention stage T3. The first bias compensation stage T2 is located between the data write stage T1 and the retention stage T3. The retention stage T3 includes at least one second bias compensation stage T31.

In the data write stage T1, the data write circuit 12 is turned on, and the data voltage terminal Vdata writes a data voltage signal Va to the first terminal of the drive circuit 11.

In the first bias compensation stage T2, the data write circuit 12 is turned on, and the data voltage terminal Vdata writes the data voltage signal Va to the first terminal of the drive circuit 11.

In the at least one second bias compensation stage T31, the bias compensation circuit 13 is turned on, and the bias compensation voltage terminal DVH writes a bias adjustment voltage signal Vb to the first terminal of the drive circuit 11.

Specifically, the display panel includes a base substrate 30, and an array layer 40 and a display layer 50 that are located on one side of the base substrate 30. The array layer 40 includes multiple pixel circuits 10. The display layer 50 includes multiple light-emitting elements 20. Specifically, the multiple light-emitting elements 20 may include an organic light-emitting diode or may include an inorganic light-emitting diode. The light-emitting element 20 includes a first electrode, a light-emitting layer and a second electrode that are stacked. In an embodiment, the first electrode is an anode, and the second electrode is a cathode. Certainly, in other embodiments of the present invention, the display panel may further include other structures. Exemplarily, one side of the display layer 50 facing away from the base substrate 30 may be provided with an encapsulation layer for encapsulating and protecting the light-emitting element 20. Alternatively, when further having a touch function, the display panel further includes a touch layer. In this embodiment, the display panel includes, but is not limited to, the preceding structure. The structure of the display panel is not specifically limited in this embodiment, and an explanation may be made with reference to the structure of the display panel in the related art.

The pixel circuit 10 is electrically connected to the light-emitting element 20 and is configured to drive the light-emitting element 20 electrically connected to the pixel circuit 10 to emit light. Specifically, the pixel circuit 10 supplies a drive current to the light-emitting element 20 electrically connected to the pixel circuit 10, and the light-emitting element 20 displays a certain brightness according to the magnitude of the drive current.

The pixel circuit 10 includes the drive circuit 11, the data write circuit 12 and the bias compensation circuit 13. The first terminal of the data write circuit 12 is connected to the data voltage terminal Vdata, and the second terminal of the data write circuit 12 is electrically connected to the first terminal of the drive circuit 11. When the data write circuit 12 is turned on, a signal of the data voltage terminal Vdata may be transmitted to the first terminal of the drive circuit 11. The first terminal of the bias compensation circuit 13 is connected to the bias compensation voltage terminal DVH, and the second terminal of the bias compensation circuit 13 is electrically connected to the first terminal of the drive circuit 11. When the bias compensation circuit 13 is turned on, a signal of the bias compensation voltage terminal DVH may be transmitted to the first terminal of the drive circuit 11.

With reference to the circuit diagram shown in FIG. 3 and the timing diagram shown in FIG. 4, within the display time of one frame of the display panel, the operation process of the pixel circuit 10 includes the data write stage T1, the first bias compensation stage T2 and the retention stage T3. The first bias compensation stage T2 is located between the data write stage T1 and the retention stage T3. The retention stage T3 includes the at least one second bias compensation stage T31.

In the data write stage T1, the data write circuit 12 is turned on, and the data voltage terminal Vdata writes the data voltage signal Va to the first terminal of the drive circuit 11, and a drive transistor M1 in the drive circuit 11 may sequentially form a drive current based on the data voltage signal Va.

The first bias compensation stage T2 is located between the data write stage T1 and the retention stage T3, that is, the first bias compensation stage T2 is located after the data write stage T1 and before the retention stage T3. In the first bias compensation stage T2, the data write circuit 12 is turned on, and the data voltage terminal Vdata writes the data voltage signal Va to the first terminal of the drive circuit 11 so that the drive transistor M1 in the drive circuit 11 can be biased. Therefore, the light-emitting element 20 can emit light based on a drive current generated by the biased drive transistor M1 in a subsequent light emission stage in the first bias compensation stage T2 and a light emission stage in the retention stage T3. Moreover, in the first bias compensation stage T2, the bias effect of the drive transistor M1 is achieved based on the data voltage signal Va so that the bias effect of the drive transistor M1 can vary with the data voltage set by the highest brightness of the current picture when pictures are displayed in different frames in the first bias compensation stage T2, avoiding an excessive bias in the first bias compensation stage T2.

The retention stage T3 includes the at least one second bias compensation stage T31. In the at least one second bias compensation stage T31, the bias compensation circuit 13 is turned on, and the bias compensation voltage terminal DVH writes the bias adjustment voltage signal Vb to the first terminal of the drive circuit 11 so that the bias adjustment voltage signal Vb can be transmitted to the first terminal of the drive circuit 11, and the drive transistor M1 in the drive circuit 11 can be biased, thereby avoiding a characteristic bias of the drive transistor M1 for the drive transistor M1 has not performed data writing for a long time. Therefore, the electrical performance of the drive transistor M1 can be restored, and the driving effect of the drive circuit 11 can be improved.

Moreover, since the data write circuit 12 is turned on in the first bias compensation stage T2, the data voltage terminal Vdata writes the data voltage signal Va to the first terminal of the drive circuit 11 so that the drive transistor M1 in the drive circuit 11 can be biased. In the at least one second bias compensation stage T31, the bias compensation circuit 13 is turned on, and the bias compensation voltage terminal DVH writes the bias adjustment voltage signal Vb to the first terminal of the drive circuit 11 so that the drive transistor M1 in the drive circuit 11 can be biased. Therefore, in the first bias compensation stage T2 and the at least one second bias compensation stage T31, the voltage signal written into the first terminal of the drive circuit 11 can be set differentially, and the conduction time of the data write circuit 12 and the conduction time of the bias compensation circuit 13 can also be set differentially. Correspondingly, the bias effect of the drive transistor M1 in the drive circuit 11 in the first bias compensation stage T2 and the at least one second bias compensation stage T31 can be set differentially. That is, without adjusting the architecture of the driver chip, the bias effect can be flexibly set in the first bias compensation stage T2 and the at least one second bias compensation stage T31, the problem of a picture flicker can be effectively improved when the display panel displays in the related art, and the setting cost and power consumption of the driver chip can be effectively reduced.

With continued reference to FIGS. 3 and 4, in some embodiments, the pixel circuit further includes a first light emission control circuit 15, a second light emission control circuit 16, a first reset circuit 17, a threshold compensation circuit 14 and a second reset circuit 18.

A control terminal of the first light emission control circuit 15 is electrically connected to a light emission control signal terminal Emit, a first terminal of the first light emission control circuit 15 is connected to a first power signal PVDD, and a second terminal of the first light emission control circuit 15 is electrically connected to the first terminal of the drive circuit 11. The first light emission control circuit 15 is configured to supply the first power signal PVDD to a first terminal of the drive transistor M1 in the drive circuit 11.

A control terminal of the second light emission control circuit 16 is electrically connected to the light emission control signal terminal Emit, a first terminal of the second light emission control circuit 16 is electrically connected to a second terminal of the drive circuit 11, and a second terminal of the second light emission control circuit 16 is electrically connected to an anode of the light-emitting element 20. The second light emission control circuit 16 is configured to control the drive current generated by the drive transistor M1 in the drive circuit 11 to transmit to the light-emitting element 20.

A control terminal of the threshold compensation circuit 14 is electrically connected to a first scan signal terminal S1, a first terminal of the threshold compensation circuit 14 is electrically connected to the second terminal of the drive circuit 11, and a second terminal of the threshold compensation circuit 14 is electrically connected to a control terminal of the drive circuit 11. The threshold compensation circuit 14 is configured to compensate for the threshold voltage of the drive transistor M1 in the drive circuit 11.

A cathode of the light-emitting element 20 is connected to a second power signal PVEE.

A control terminal of the first reset circuit 17 is electrically connected to a second scan signal terminal S2, a first terminal of the first reset circuit 17 is electrically connected to a reset signal terminal Vref, and a second terminal of the first reset circuit 17 is electrically connected to the control terminal of the drive circuit 11. The first reset circuit 26 is configured to supply a first reset signal to the control terminal of the drive circuit 11.

A control terminal of the second reset circuit 18 is electrically connected to the first scan signal terminal S1, a first terminal of the second reset circuit 18 is electrically connected to the reset signal terminal Vref, and a second terminal of the second reset circuit 18 is electrically connected to the anode of the light-emitting element 20. The second reset circuit 18 is configured to supply a second reset signal to the anode of the light-emitting element 20. The second reset signal may be the same as the first reset signal or may also be different from the first reset signal.

It is to be noted that the specific structures of the reset circuits, the threshold compensation circuit and the light emission control circuit are not limited in the embodiments of the present invention, and the circuits of the pixel circuit may be designed according to actual needs on the premise that the bias compensation function for the threshold voltage of the drive transistor can be fulfilled. To facilitate the understanding, examples of the specific structures of the reset circuits, the threshold compensation circuit and the light emission control circuit are described below in the embodiments of the present invention, where the circuits may optionally include thin-film transistors. With continued reference to FIG. 3, FIG. 3 exemplarily illustrates a circuit structure in which the pixel circuit in the display panel has an 8T1C structure. Certainly, in other embodiments of the present invention, the pixel circuit may also have other circuit structures, and details are not repeated in the present invention.

With continued reference to FIGS. 3 and 4, in some embodiments, the pixel circuit further includes the threshold compensation circuit 14. The first terminal of the threshold compensation circuit 14 is electrically connected to the second terminal of the drive circuit 11, and the second terminal of the threshold compensation circuit 14 is electrically connected to the control terminal of the drive circuit 11.

In the data write stage T1, the threshold compensation circuit 14 is turned on.

In the first bias compensation stage T2, the threshold compensation circuit 14 is turned off.

Specifically, the pixel circuit further includes the threshold compensation circuit 14, the first terminal of the threshold compensation circuit 14 is electrically connected to the second terminal of the drive circuit 11, the second terminal of the threshold compensation circuit 14 is electrically connected to the control terminal of the drive circuit 11, and the threshold compensation circuit 14 is configured to compensate for the threshold voltage of the drive transistor M1 in the drive circuit 11.

In the data write stage T1, the threshold compensation circuit 14 is turned on so that the potential of the first terminal of the drive circuit 11 can be transmitted to the control terminal of the drive circuit 11 through the drive circuit 11 and the threshold compensation circuit 14.

In the first bias compensation stage T2, the threshold compensation circuit 14 is turned off so that the potential of the control terminal of the drive circuit 11 can be prevented from being affected when the drive transistor M1 in the drive circuit 11 is biased.

With continued reference to FIGS. 3 and 4, in some embodiments, the first bias compensation stage T2 and the data write stage T1 have the same duration.

Specifically, a control terminal of the data write circuit 12 is electrically connected to a third scan signal terminal SP, and a signal of the third scan signal terminal SP is an effective pulse in the data write stage T1 so that the data write circuit 12 can be turned on. In the first bias compensation stage T2, the signal of the third scan signal terminal SP is also an effective pulse so that the data write circuit 12 can be turned on. The first bias compensation stage T2 and the data write stage T1 have the same duration. In this case, the duration of the first bias compensation stage T2 is set based on the duration of the data write stage T1 in the related art, that is, based on an existing effective pulse in the signal of the third scan signal terminal SP, so the first bias compensation stage T2 can be set by only adjusting the frequency of the effective pulse of the signal of the third scan signal terminal SP so that the difficulty in setting the signal of the third scan signal terminal SP can be reduced.

Figure 5:
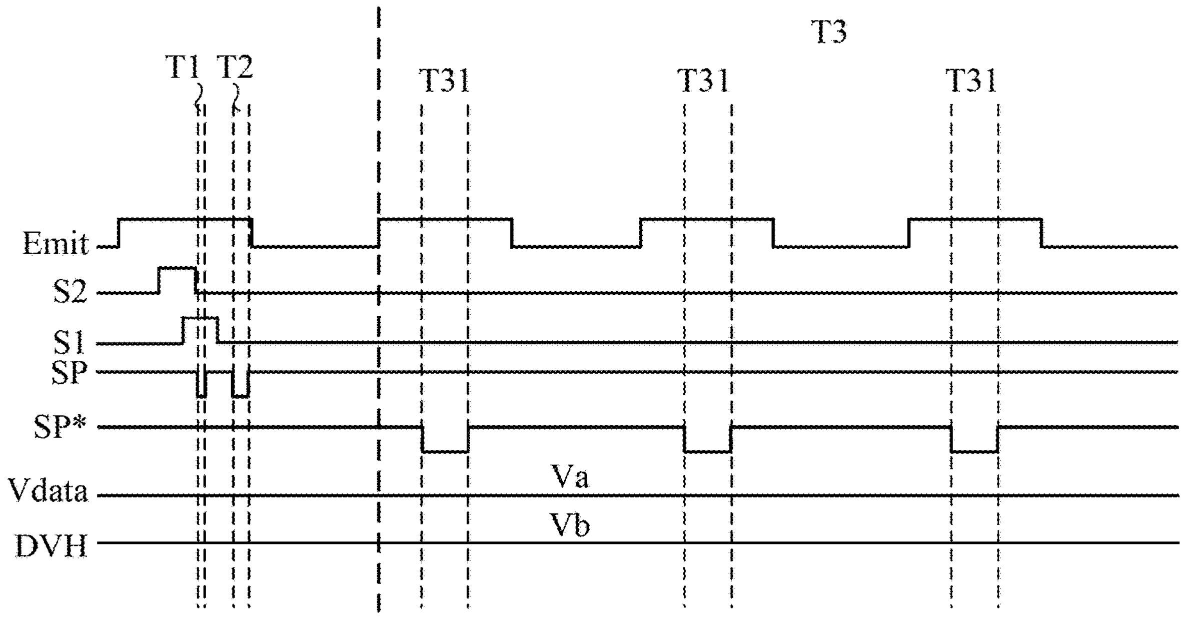
FIG. 5 is another drive timing diagram according to the present invention.

FIG. 5 is another drive timing diagram according to the present invention. Referring to FIGS. 3 and 5, in some embodiments, the first bias compensation stage T2 and the data write stage T1 have different durations.

Specifically, the control terminal of the data write circuit 12 is electrically connected to the third scan signal terminal SP, and the signal of the third scan signal terminal SP is an effective pulse in the data write stage T1 so that the data write circuit 12 can be turned on. In the first bias compensation stage T2, the signal of the third scan signal terminal SP is also an effective pulse so that the data write circuit 12 can be turned on. The first bias compensation stage T2 and the data write stage T1 have different durations, that is, the effective pulse of the signal of the third scan signal terminal SP has different durations in the first bias compensation stage T2 and the data write stage T1, that is, the duration of the effective pulse of the signal of the third scan signal terminal SP in the first bias compensation stage T2 is not limited by the duration of the effective pulse of the signal of the third scan signal terminal SP in the data write stage T1, so that the duration of the effective pulse of the signal of the third scan signal terminal SP in the first bias compensation stage T2 can be adjusted according to the bias effect required for the drive transistor M1 in the drive circuit 11 in the first bias compensation stage T2.

Figure 6:
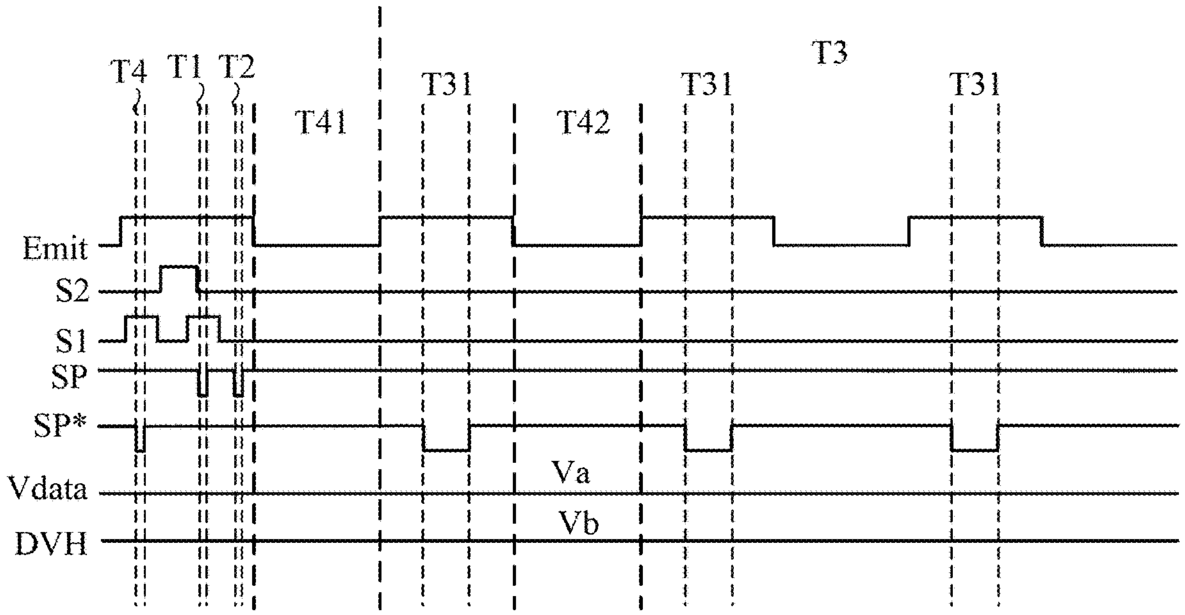
FIG. 6 is another drive timing diagram according to the present invention.

FIG. 6 is another drive timing diagram according to the present invention. Referring to FIGS. 3 and 6, in some embodiments, within the display time of one frame of the display panel, the operation process of the pixel circuit further includes a reset stage T4, and the reset stage T4 is located before the data write stage T1.

In the reset stage T4, the bias compensation circuit 13 is turned on, and the bias compensation voltage terminal DVH writes the bias adjustment voltage signal Vb to the first terminal of the drive circuit 11.

Specifically, within the display time of one frame of the display panel, the operation process of the pixel circuit further includes the reset stage T4, and the reset stage T4 is located before the data write stage T1. In the reset stage T4, the bias compensation circuit 13 is turned on, and the bias compensation voltage terminal DVH writes the bias adjustment voltage signal Vb to the first terminal of the drive circuit 11 so that the drive transistor M1 in the drive circuit 11 can be reset once, and a smear can be reduced when the display panel undergoes picture switching.

With continued reference to FIGS. 3 and 6, in some embodiments, a second bias compensation stage T31 of the at least one second bias compensation stage T31 and the reset stage T4 have different durations.

Specifically, a control terminal of the bias compensation circuit 13 is electrically connected to a fourth scan signal terminal SP*, and a signal of the fourth scan signal terminal SP* is an effective pulse in the reset stage T4 so that the bias compensation circuit 13 can be turned on. In the at least one second bias compensation stage T31, the signal of the fourth scan signal terminal SP* is also an effective pulse so that the bias compensation circuit 13 can be turned on. The second bias compensation stage T31 and the reset stage T4 have different durations, that is, the effective pulse of the signal of the fourth scan signal terminal SP* has different durations in the at least one second bias compensation stage T31 and the reset stage T4, that is, the duration of the effective pulse of the signal of the fourth scan signal terminal SP* in the at least one second bias compensation stage T31 is not limited by the duration of the effective pulse of the signal of the fourth scan signal terminal SP* in the reset stage T4, so that the duration of the effective pulse of the signal of the fourth scan signal terminal SP* in the at least one second bias compensation stage T31 can be adjusted according to the bias effect required for the drive transistor M1 in the drive circuit 11 in the at least one second bias compensation stage T31.

With continued reference to FIGS. 3 and 6, in some embodiments, the second bias compensation stage T31 has a duration greater than the reset stage T4.

Specifically, within the display time of one frame of the display panel, the operation process of the pixel circuit further includes a first light emission stage T41 and a second light emission stage T42. The first light emission stage T41 is located between the first bias compensation stage T2 and a first second bias compensation stage T31. The second light emission stage T42 is located between two adjacent second bias compensation stages T31. Since the drive current generated by the drive transistor M1 in the first light emission stage T41 after the first bias compensation stage T2 is reduced by the influence of a strong reset exerted on the drive transistor M1 in the reset stage T4, the light-emitting brightness of the display panel is reduced in the first light emission stage T41. In this case, the duration of the second bias compensation stage T31 may be adjusted to be greater than the duration of the reset stage T4, that is, the duration of the second bias compensation stage T31 is relatively long, so that the light-emitting brightness of the display panel in the second light emission stage T42 can be reduced. Therefore, the difference between the light-emitting brightness of the display panel in the second light emission stage T42 and the light-emitting brightness of the display panel in the first light emission stage T41 can be reduced so that the brightness of a display picture in the light emission stages of the display panel can tend to be the same within one-frame picture time of the display panel, effectively improving the screen flicker and improving the visual experience.

Figure 7:
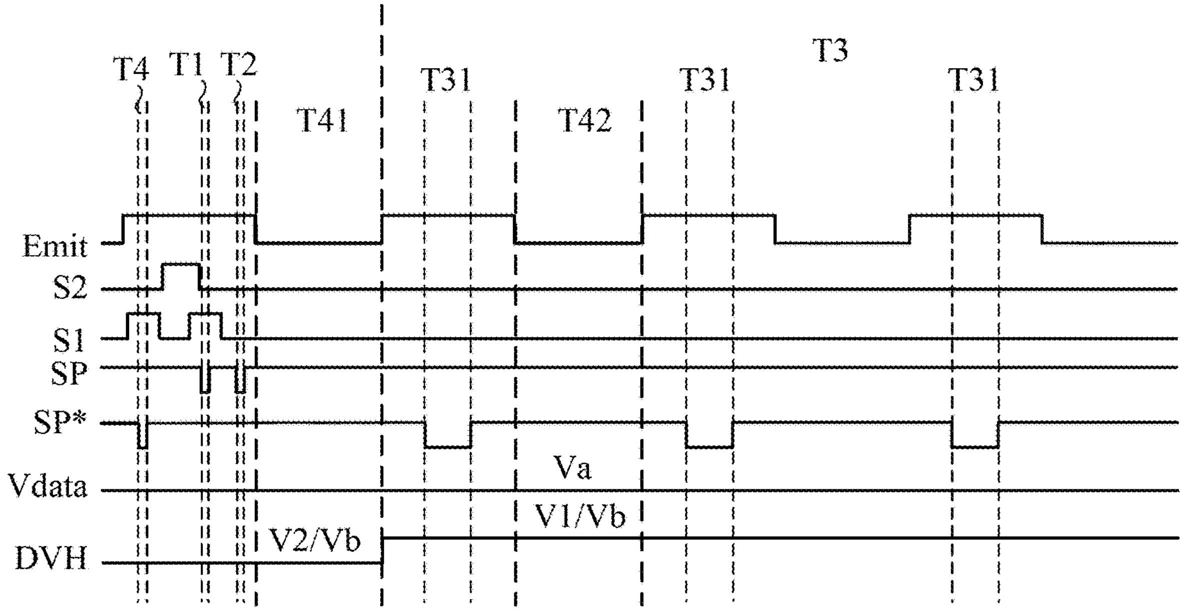
FIG. 7 is another drive timing diagram according to the present invention.

FIG. 7 is another drive timing diagram according to the present invention. Referring to FIGS. 3 and 7, in some embodiments, in the at least one second bias compensation stage T31, the voltage value of the bias adjustment voltage signal Vb is V1, in the reset stage T4, the voltage value of the bias adjustment voltage signal Vb is V2, and V1≠V2. Specifically, in the at least one second bias compensation stage T31, the bias compensation circuit 13 is turned on, and the bias compensation voltage terminal DVH writes the bias adjustment voltage signal Vb to the first terminal of the drive circuit 11 so that the drive transistor M1 in the drive circuit 11 can be biased. In the reset stage T4, the bias compensation circuit 13 is turned on, and the bias compensation voltage terminal DVH writes the bias adjustment voltage signal Vb to the first terminal of the drive circuit 11 so that the drive transistor M1 in the drive circuit 11 can be biased. In the at least one second bias compensation stage T31, the voltage value of the bias adjustment voltage signal Vb is V1, and in the reset stage T4, the voltage value of the bias adjustment voltage signal Vb is V2, and V1≠V2. That is, the bias adjustment voltage signal Vb has different voltage values in the at least one second bias compensation stage T31 and the reset stage T4. That is, the voltage value of the bias adjustment voltage signal Vb in the at least one second bias compensation stage T31 is not limited by the voltage value of the bias adjustment voltage signal Vb in the reset stage T4 so that the voltage value of the bias adjustment voltage signal Vb in the at least one second bias compensation stage T31 can be adjusted according to the bias effect required for the drive transistor M1 in the drive circuit 11 in the at least one second bias compensation stage T31.

With continued reference to FIGS. 3 and 7, in some embodiments, V1>V2.

Specifically, within the display time of one frame of the display panel, the operation process of the pixel circuit further includes the first light emission stage T41 and the second light emission stage T42. The first light emission stage T41 is located between the first bias compensation stage T2 and the first second bias compensation stage T31. The second light emission stage T42 is located between the two adjacent second bias compensation stages T31. Since the drive current generated by the drive transistor M1 in the first light emission stage T41 after the first bias compensation stage T2 is reduced by the influence of the strong reset exerted on the drive transistor M1 in the reset stage T4, the light-emitting brightness of the display panel is reduced in the first light emission stage T41. In this case, the voltage value of the bias adjustment voltage signal Vb in the at least one second bias compensation stage T31 may be adjusted to be greater than the voltage value of the bias adjustment voltage signal Vb in the reset stage T4, that is, the voltage value of the bias adjustment voltage signal Vb in the at least one second bias compensation stage T31 is relatively large, so that the light-emitting brightness of the display panel in the second light emission stage T42 can be reduced. Therefore, the difference between the light-emitting brightness of the display panel in the second light emission stage T42 and the light-emitting brightness of the display panel in the first light emission stage T41 can be reduced so that the brightness of a display picture in the light emission stages of the display panel can tend to be the same within the one-frame picture time of the display panel, effectively improving the screen flicker and improving the visual experience.

Figure 8:
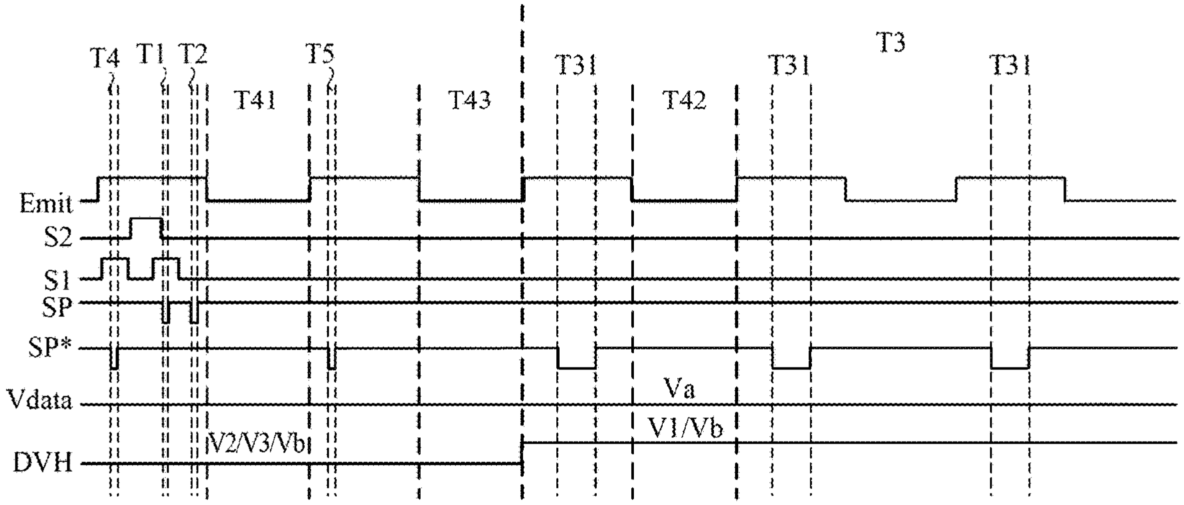
FIG. 8 is another drive timing diagram according to the present invention.

FIG. 8 is another drive timing diagram according to the present invention. Referring to FIGS. 3 and 8, in some embodiments, within the display time of one frame of the display panel, the operation process of the pixel circuit further includes a third bias compensation stage T5, and the third bias compensation stage T5 is located between the first bias compensation stage T2 and the retention stage T3.

In the third bias compensation stage T5, the bias compensation circuit 13 is turned on, and the bias compensation voltage terminal DVH writes the bias adjustment voltage signal Vb to the first terminal of the drive circuit 11.

Specifically, within the display time of one frame of the display panel, the operation process of the pixel circuit further includes the third bias compensation stage T5, and the third bias compensation stage T5 is located between the first bias compensation stage T2 and the retention stage T3. In the third bias compensation stage T5, the bias compensation circuit 13 is turned on, and the bias compensation voltage terminal DVH writes the bias adjustment voltage signal Vb to the first terminal of the drive circuit 11 so that the drive transistor M1 in the drive circuit 11 can be biased. The third bias compensation stage T5 is set between the first bias compensation stage T2 and the retention stage T3 so that the bias effect of the drive transistor M1 in the drive circuit 11 can be enriched, and so that the brightness of a display picture in the light emission stages of the display panel can tend to be the same within the one-frame picture time of the display panel, effectively improving the screen flicker and improving the visual experience.

Referring to FIGS. 3 and 8, in some embodiments, in the third bias compensation stage T5, the voltage value of the bias adjustment voltage signal Vb is V3, in the reset stage T4, the voltage value of the bias adjustment voltage signal Vb is V2, and V2=V3.

Specifically, the bias adjustment voltage signal Vb has the same voltage value in the third bias compensation stage T5 and the reset stage T4, that is, the voltage value of the bias adjustment voltage signal Vb in the third bias compensation stage T5 may be set based on the voltage value of the bias adjustment voltage signal Vb in the reset stage T4, so that the difficulty in setting the bias adjustment voltage signal Vb can be reduced.

Figure 9:
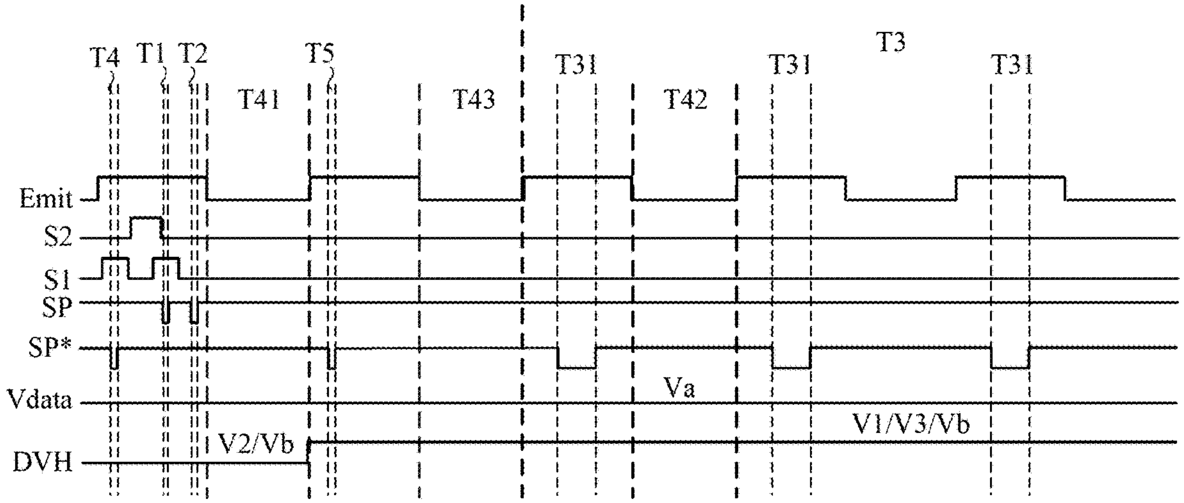
FIG. 9 is another drive timing diagram according to the present invention.

FIG. 9 is another drive timing diagram according to the present invention. Referring to FIGS. 3 and 9, optionally, in the third bias compensation stage T5, the voltage value of the bias adjustment voltage signal Vb is V3, and in the at least one second bias compensation stage T31, the voltage value of the bias adjustment voltage signal Vb is V1, and V1=V3.

Specifically, the bias adjustment voltage signal Vb has the same voltage value in the third bias compensation stage T5 and the at least one second bias compensation stage T31, that is, the voltage value of the bias adjustment voltage signal Vb in the third bias compensation stage T5 may be set based on the voltage value of the bias adjustment voltage signal Vb in the at least one second bias compensation stage T31, so that the difficulty in setting the adjustment voltage signal Vb can be reduced.

Figure 10:
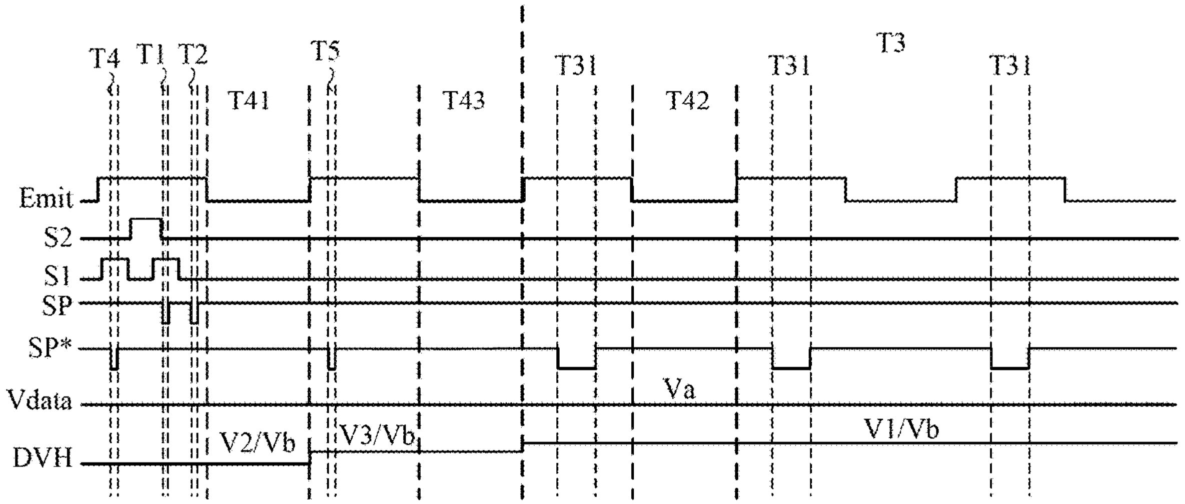
FIG. 10 is another drive timing diagram according to the present invention.

FIG. 10 is another drive timing diagram according to the present invention. Referring to FIGS. 3 and 10, optionally, in the third bias compensation stage T5, the voltage value of the bias adjustment voltage signal Vb is V3, in the at least one second bias compensation stage T31, the voltage value of the bias adjustment voltage signal Vb is V1, and in the reset stage T4, the voltage value of the bias adjustment voltage signal Vb is V2, and V1>V3>V2.

Specifically, within the display time of one frame of the display panel, the operation process of the pixel circuit further includes the first light emission stage T41, the second light emission stage T42 and a third light emission stage 43. The first light emission stage T41 is located between the first bias compensation stage T2 and the first second bias compensation stage T31. The second light emission stage T42 is located between the two adjacent second bias compensation stages T31. The third light emission stage 43 is located between the third bias compensation stage T5 and the first second bias compensation stage T31. Since the drive current generated by the drive transistor M1 in the first light emission stage T41 after the first bias compensation stage T2 is reduced by the influence of the strong reset exerted on the drive transistor M1 in the reset stage T4, the light-emitting brightness of the display panel is reduced in the first light emission stage T41. In this case, the voltage value of the bias adjustment voltage signal Vb in the at least one second bias compensation stage T31 may be adjusted to be greater than the voltage value of the bias adjustment voltage signal Vb in the reset stage T4, that is, the voltage value of the bias adjustment voltage signal Vb in the at least one second bias compensation stage T31 is relatively large, so that the light-emitting brightness of the display panel in the second light emission stage T42 can be reduced. Correspondingly, the drive current generated by the drive transistor M1 in the third light emission stage 43 is also reduced by the influence of the strong reset exerted on the drive transistor M1 in the reset stage T4, so the light-emitting brightness of the display panel in the third light emission stage 43 is between the light-emitting brightness of the display panel in the first light emission stage 41 and the light-emitting brightness of the display panel in the second light emission stage 42. Therefore, the voltage value of the bias adjustment voltage signal Vb set in the third bias compensation stage T5 can be located between the voltage value of the bias adjustment voltage signal Vb in the at least one second bias compensation stage T31 and the voltage value of the bias adjustment voltage signal Vb in the reset stage T4 so that the differences of the light-emitting brightness of the display panel in the first light emission stage T41, the second light emission stage T42 and the third light emission stage 43 can be reduced, and so that the brightness of a display picture in the light emission stages of the display panel can tend to be the same within the one-frame picture time of the display panel, effectively improving the screen flicker and improving the visual experience.

With continued reference to FIGS. 3 and 8, in some embodiments, the third bias compensation stage T5 and the reset stage T4 have the same duration.

Specifically, the control terminal of the bias compensation circuit 13 is electrically connected to the fourth scan signal terminal SP*, and the signal of the fourth scan signal terminal SP* is an effective pulse in the reset stage T4 so that the bias compensation circuit 13 can be turned on. In the third bias compensation stage T5, the signal of the fourth scan signal terminal SP* is also an effective pulse so that the bias compensation circuit 13 can be turned on. The third bias compensation stage T5 and the reset stage T4 have the same duration. In this case, the duration of the third bias compensation stage T5 is set based on the duration of the reset stage T4 in the related art, that is, based on the existing effective pulse in the signal of the fourth scan signal terminal SP*, so the third bias compensation stage T5 can be set by only adjusting the corresponding frequency of the effective pulse of the signal in the fourth scan signal terminal SP* so that the difficulty in setting the signal of the fourth scan signal terminal SP* can be reduced.

Figure 11:
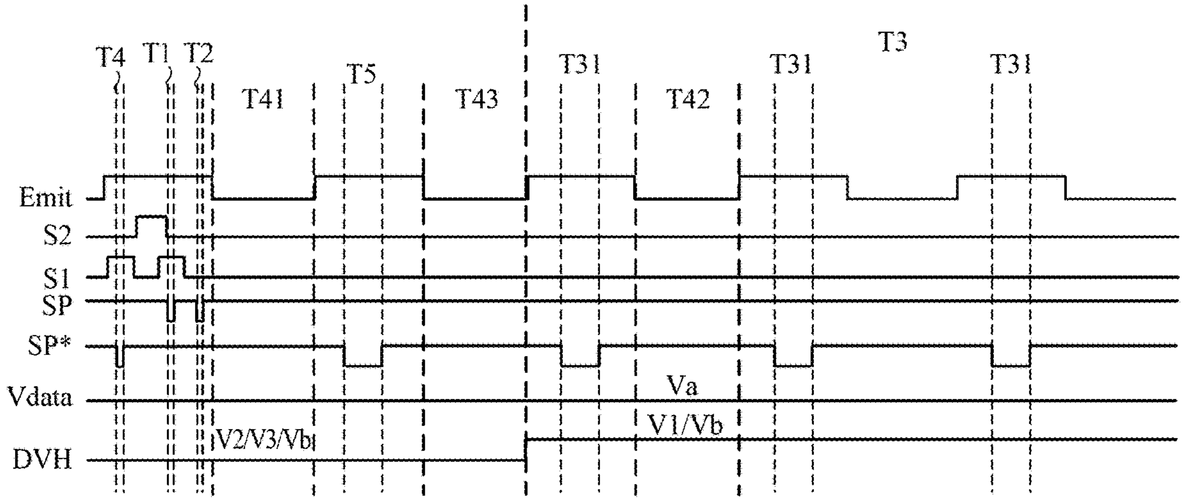
FIG. 11 is another drive timing diagram according to the present invention.

FIG. 11 is another drive timing diagram according to the present invention. Referring to FIGS. 3 and 11, in some embodiments, the third bias compensation stage T5 and the second bias compensation stage T31 have the same duration.

Specifically, the control terminal of the bias compensation circuit 13 is electrically connected to the fourth scan signal terminal SP*, and the signal of the fourth scan signal terminal SP* is an effective pulse in the at least one second bias compensation stage T31 so that the bias compensation circuit 13 can be turned on. In the third bias compensation stage T5, the signal of the fourth scan signal terminal SP* is also an effective pulse so that the bias compensation circuit 13 can be turned on. The third bias compensation stage T5 and the second bias compensation stage T31 have the same duration. In this case, the duration of the third bias compensation stage T5 may be set based on the duration of the second bias compensation stage T31 in the related art, that is, based on the existing effective pulse in the signal of the fourth scan signal terminal SP*, so the third bias compensation stage T5 can be set by only adjusting the corresponding frequency of the effective pulse in the signal of the fourth scan signal terminal SP* so that the difficulty in setting the signal of the fourth scan signal terminal SP* can be reduced.

Figure 12:
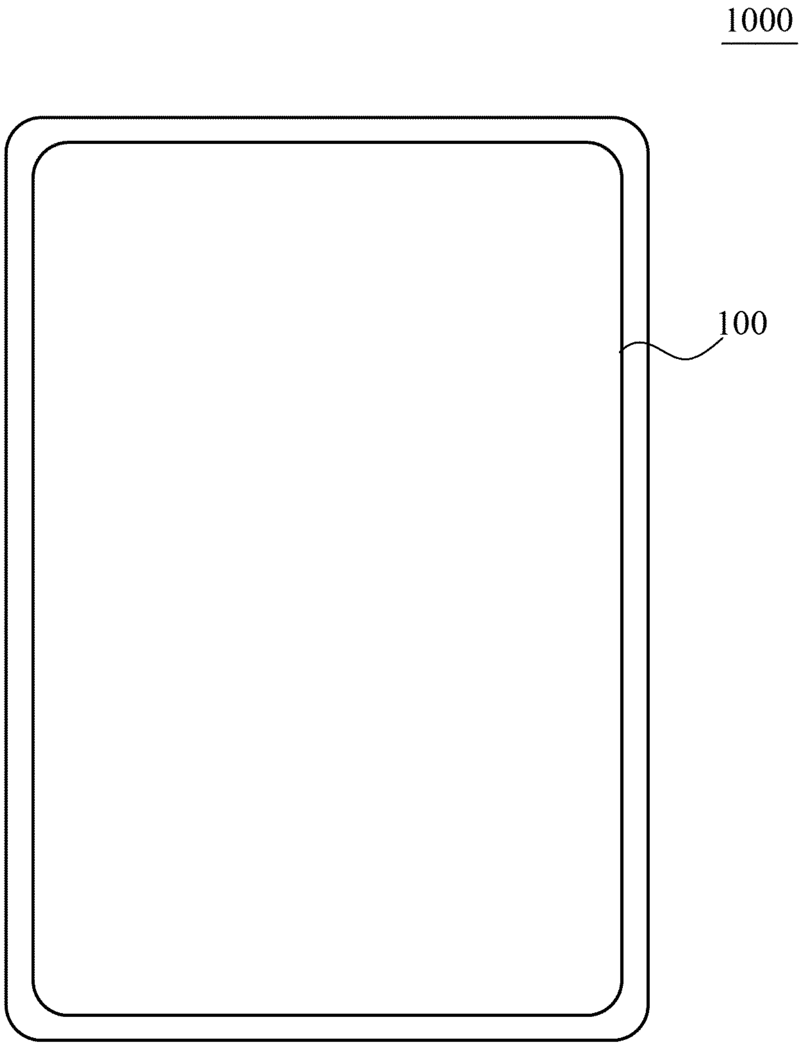
FIG. 12 is a plan diagram illustrating a display device according to the present invention.

In some embodiments, referring to FIG. 12 which is a plan diagram illustrating a display device according to the present invention, the display device 1000 provided in this embodiment includes the display panel 100 provided in the preceding embodiments of the present invention. In the embodiment of FIG. 12, the display device 1000 is described by using a mobile phone as an example. It is to be understood that the display device 1000 provided in the embodiment of the present invention may also be a computer, a television, an in-vehicle display device, or another display device 1000 having a display function. This is not specifically limited in the present invention. The display device 1000 provided in the embodiment of the present invention has the beneficial effects of the display panel 100 provided in the embodiments of the present invention. For details, reference may be made to the detailed description of the display panel 100 in the preceding embodiments. Details are not repeated here in this embodiment.

As can be seen from the preceding embodiments, the display panel and the display device provided in the present invention achieve at least the beneficial effects below.

In the display panel provided in the present invention, in the first bias compensation stage, the bias effect of the drive transistor in the drive circuit is achieved based on the data voltage signal so that the bias effect of the drive transistor can vary with the data voltage set by the highest brightness of the current picture when the pictures are displayed in different frames in the first bias compensation stage, avoiding an excessive bias in the first bias compensation stage. Moreover, since the data write circuit is turned on in the first bias compensation stage, the data voltage terminal writes the data voltage signal to the first terminal of the drive circuit so that the drive transistor in the drive circuit can be biased. In the at least one second bias compensation stage, the bias compensation circuit is turned on, and the bias compensation voltage terminal writes the bias adjustment voltage signal to the first terminal of the drive circuit so that the drive transistor in the drive circuit can be biased. Therefore, in the first bias compensation stage and the at least one second bias compensation stage, the voltage signal written into the first terminal of the drive circuit can be set differentially, and the conduction time of the data write circuit and the conduction time of the bias compensation circuit can also be set differentially. Correspondingly, the bias effect of the drive transistor in the drive circuit in the first bias compensation stage and the at least one second bias compensation stage can be set differentially. That is, without adjusting the architecture of the driver chip, the bias effect can be flexibly set in the first bias compensation stage and the at least one second bias compensation stage, the problem of a picture flicker can be effectively improved when the display panel displays in the related art, and the setting cost and power consumption of the driver chip can be effectively reduced.

Although some particular embodiments of the present invention have been described in detail by way of examples, it is to be understood by those skilled in the art that the preceding examples are for the purpose of description only and are not intended to limit the scope of the present invention. It is to be understood by those skilled in the art that modifications may be made to the preceding embodiments without departing from the scope and spirit of the present invention. The scope of the present invention is defined by the appended claims.

What is claimed is:

1. A display panel, comprising:

a pixel circuit and a light-emitting element electrically connected to the pixel circuit, wherein the pixel circuit comprises a drive circuit, a data write circuit and a bias compensation circuit, a first terminal of the data write circuit is connected to a data voltage terminal, a second terminal of the data write circuit is electrically connected to a first terminal of the drive circuit, a first terminal of the bias compensation circuit is connected to a bias compensation voltage terminal, and a second terminal of the bias compensation circuit is electrically connected to the first terminal of the drive circuit;

within display time of one frame of the display panel, an operation process of the pixel circuit comprises a data write stage, a first bias compensation stage and a retention stage, the first bias compensation stage is located between the data write stage and the retention stage, and the retention stage comprises a plurality of second bias compensation stages;

in the data write stage, the data write circuit is turned on, and the data voltage terminal writes a data voltage signal to the first terminal of the drive circuit;

in the first bias compensation stage, the data write circuit is turned on, and the data voltage terminal writes the data voltage signal to the first terminal of the drive circuit; and in the plurality of second bias compensation stages, the bias compensation circuit is turned on, and the bias compensation voltage terminal writes a bias adjustment voltage signal to the first terminal of the drive circuit;

wherein within the display time of one frame of the display panel, the operation process of the pixel circuit further comprises a reset stage, and the reset stage is located before the data write stage;

in the reset stage, the bias compensation circuit is turned on, and the bias compensation voltage terminal writes the bias adjustment voltage signal to the first terminal of the drive circuit.

2. The display panel according to claim 1, wherein the pixel circuit further comprises a threshold compensation circuit, a first terminal of the threshold compensation circuit is electrically connected to a second terminal of the drive circuit, and a second terminal of the threshold compensation circuit is electrically connected to a control terminal of the drive circuit;

in the data write stage, the threshold compensation circuit is turned on; and in the first bias compensation stage, the threshold compensation circuit is turned off.

3. The display panel according to claim 1, wherein the first bias compensation stage and the data write stage have a same duration.

4. The display panel according to claim 1, wherein the first bias compensation stage and the data write stage have different durations.

5. The display panel according to claim 1, wherein a second bias compensation stage of the plurality of second bias compensation stages and the reset stage have different durations.

6. The display panel according to claim 5, wherein the second bias compensation stage has a duration greater than the reset stage.

7. The display panel according to claim 1, wherein in the plurality of second bias compensation stages, a voltage value of the bias adjustment voltage signal is V1; and in the reset stage, a voltage value of the bias adjustment voltage signal is V2, wherein V1≠V2.

8. The display panel according to claim 7, wherein V1>V2.

9. The display panel according to claim 1, wherein within the display time of one frame of the display panel, the operation process of the pixel circuit further comprises a third bias compensation stage, and the third bias compensation stage is located between the first bias compensation stage and the retention stage; and in the third bias compensation stage, the bias compensation circuit is turned on, and the bias compensation voltage terminal writes the bias adjustment voltage signal to the first terminal of the drive circuit.

10. The display panel according to claim 9, wherein in the third bias compensation stage, a voltage value of the bias adjustment voltage signal is V3; and in the reset stage, a voltage value of the bias adjustment voltage signal is V2, wherein V2=V3.

11. The display panel according to claim 9, wherein the third bias compensation stage and the reset stage have a same duration.

12. The display panel according to claim 9, wherein the third bias compensation stage and a second bias compensation stage of the plurality of second bias compensation stages have a same duration.

13. The display panel according to claim 1, wherein the pixel circuit further comprises a first light emission control circuit, a second light emission control circuit, a first reset circuit, a threshold compensation circuit and a second reset circuit;

a control terminal of the first light emission control circuit is electrically connected to a light emission control signal terminal, a first terminal of the first light emission control circuit is connected to a first power signal, and a second terminal of the first light emission control circuit is electrically connected to the first terminal of the drive circuit;

a control terminal of the second light emission control circuit is electrically connected to the light emission control signal terminal, a first terminal of the second light emission control circuit is electrically connected to a second terminal of the drive circuit, and a second terminal of the second light emission control circuit is electrically connected to an anode of the light-emitting element;

a control terminal of the threshold compensation circuit is electrically connected to a first scan signal terminal, a first terminal of the threshold compensation circuit is electrically connected to the second terminal of the drive circuit, and a second terminal of the threshold compensation circuit is electrically connected to a control terminal of the drive circuit;

a cathode of the light-emitting element is connected to a second power signal;

a control terminal of the first reset circuit is electrically connected to a second scan signal terminal, a first terminal of the first reset circuit is electrically connected to a reset signal terminal, and a second terminal of the first reset circuit is electrically connected to the control terminal of the drive circuit; and a control terminal of the second reset circuit is electrically connected to the first scan signal terminal, a first terminal of the second reset circuit is electrically connected to the reset signal terminal, and a second terminal of the second reset circuit is electrically connected to the anode of the light-emitting element.

14. A display device, comprising a display panel, wherein the display panel comprises:

a pixel circuit and a light-emitting element electrically connected to the pixel circuit, wherein the pixel circuit comprises a drive circuit, a data write circuit and a bias compensation circuit, a first terminal of the data write circuit is connected to a data voltage terminal, a second terminal of the data write circuit is electrically connected to a first terminal of the drive circuit, a first terminal of the bias compensation circuit is connected to a bias compensation voltage terminal, and a second terminal of the bias compensation circuit is electrically connected to the first terminal of the drive circuit;

within display time of one frame of the display panel, an operation process of the pixel circuit comprises a data write stage, a first bias compensation stage and a retention stage, the first bias compensation stage is located between the data write stage and the retention stage, and the retention stage comprises a plurality of second bias compensation stages;

in the data write stage, the data write circuit is turned on, and the data voltage terminal writes a data voltage signal to the first terminal of the drive circuit;

in the first bias compensation stage, the data write circuit is turned on, and the data voltage terminal writes the data voltage signal to the first terminal of the drive circuit; and in the plurality of second bias compensation stages, the bias compensation circuit is turned on, and the bias compensation voltage terminal writes a bias adjustment voltage signal to the first terminal of the drive circuit;

wherein within the display time of one frame of the display panel, the operation process of the pixel circuit further comprises a reset stage, and the reset stage is located before the data write stage;

in the reset stage, the bias compensation circuit is turned on, and the bias compensation voltage terminal writes the bias adjustment voltage signal to the first terminal of the drive circuit.

* * * * *